(12) United States Patent
Lin et al.

(10) Patent No.: US 10,587,361 B2
(45) Date of Patent: Mar. 10, 2020

(54) HETEROGENEOUS METHOD AND FRAMEWORK OF WI-FI INTERNET OF THINGS

(71) Applicant: ESPRESSIF SYSTEMS (SHANGHAI) PTE LTD, Shanghai (CN)

(72) Inventors: Hao Lin, Shanghai (CN); Rui Zhan, Shanghai (CN)

(73) Assignee: EXPRESSIF SYSTEMS (SHANGHAI) PTE. LTD., Shanghi (CN)

( * ) Notice: Subject to any disclaimer, the term of this patent is extended or adjusted under 35 U.S.C. 154(b) by 0 days.

(21) Appl. No.: 15/741,715

(22) PCT Filed: Dec. 29, 2015

(86) PCT No.: PCT/CN2015/099410
§ 371 (c)(1),
(2) Date: Jan. 3, 2018

(87) PCT Pub. No.: WO2017/004956
PCT Pub. Date: Jan. 12, 2017

(65) Prior Publication Data
US 2018/0205486 A1    Jul. 19, 2018

(30) Foreign Application Priority Data
Jul. 8, 2015  (CN) .......................... 2015 1 0398332

(51) Int. Cl.
*H04L 1/00*    (2006.01)
*H04W 4/70*    (2018.01)
(Continued)

(52) U.S. Cl.
CPC ......... *H04L 1/0002* (2013.01); *H04B 1/0025* (2013.01); *H04L 5/1446* (2013.01);
(Continued)

(58) Field of Classification Search
None
See application file for complete search history.

(56) References Cited

U.S. PATENT DOCUMENTS

| 7,386,036 B2 | 6/2008 | Pasanen et al. |
| 10,057,813 B1 * | 8/2018 | Likar ................. H04W 28/18 370/338 |

(Continued)

FOREIGN PATENT DOCUMENTS

| CN | 1918857 A | 2/2007 |
| CN | 104981031 A | 10/2015 |
| JP | 0715777 A | 1/1995 |

OTHER PUBLICATIONS

International Search Report (English Translation) for International Patent Application No. PCT/CN2015/099410, dated Mar. 29, 2016.
(Continued)

*Primary Examiner* — Anh Vu H Ly
(74) *Attorney, Agent, or Firm* — Amster, Rothstein & Ebenstein LLP

(57) ABSTRACT

A heterogeneous method of a Wi-Fi Internet of things (IoT) that includes arranging at least one Wi-Fi IoT bridging device in a Wi-Fi IoT, the Wi-Fi IoT bridging device using a time division technique and communicating with at least one distant IoT device in a reduced data rate mode; and a heterogeneous IoT framework that includes a wireless router connecting to an IoT and supporting a standard Wi-Fi link, bridging device connecting to the wireless router via the standard Wi-Fi link, and a Wi-Fi device in a reduced data rate mode connecting to the bridging device via the reduced data rate mode, thereby realizing bridging and swapping of data in a heterogeneous Wi-Fi IoT structure consisting of Wi-Fi IoT subnets having different baseband rates.

17 Claims, 4 Drawing Sheets

(51) Int. Cl.
*H04B 1/00* (2006.01)
*H04L 5/14* (2006.01)
*H04W 88/16* (2009.01)
*H04W 88/18* (2009.01)
*H04W 84/12* (2009.01)

(52) U.S. Cl.
CPC ............ *H04W 4/70* (2018.02); *H04W 88/16* (2013.01); *H04W 88/181* (2013.01); *H04W 84/12* (2013.01)

(56) References Cited

U.S. PATENT DOCUMENTS

| | | | | |
|---|---|---|---|---|
| 2010/0202494 | A1* | 8/2010 | Roh | H04B 1/7176 375/132 |
| 2012/0257558 | A1* | 10/2012 | Shin | H04W 52/0229 370/311 |
| 2016/0006837 | A1* | 1/2016 | Reynolds | H04W 84/18 709/203 |
| 2016/0007288 | A1* | 1/2016 | Samardzija | H04W 52/0229 370/311 |
| 2016/0100350 | A1* | 4/2016 | Laraqui | H04W 4/70 370/328 |
| 2016/0164725 | A1* | 6/2016 | Wu | H04W 76/10 713/168 |
| 2016/0165651 | A1* | 6/2016 | Pathuri | H04W 76/11 370/329 |
| 2016/0249287 | A1* | 8/2016 | Xie | H04L 9/0631 370/338 |
| 2016/0294828 | A1* | 10/2016 | Zakaria | H04W 4/70 370/338 |
| 2016/0345265 | A1* | 11/2016 | Lee | H04W 52/0235 370/338 |
| 2017/0079079 | A1* | 3/2017 | Pathuri | H04L 41/0803 370/338 |

OTHER PUBLICATIONS

Written Opinion for International Patent Application No. PCT/CN2015/099410, dated Mar. 29, 2016.

* cited by examiner

HETEROGENEOUS METHOD AND FRAMEWORK OF WI-FI INTERNET OF THINGS

This application is a National Stage entry under 35 U.S.C. 371 of International Patent Application No. PCT/CN2015/099410, filed on Dec. 29, 2015, which claims the benefit of and priority to Chinese Patent Application No. CN 201510398332.4, filed on Jul. 8, 2015 and Chinese Patent Application No. CN 201520489814.6, filed on Jul. 8, 2015 the entire contents of each of which are incorporated by reference herein.

FIELD

Embodiments of the present disclosure generally relate to the field of IoT technologies, and more particularly to a method for heterogeneously networking a Wi-Fi IoT and a heterogeneous Wi-Fi IoT architecture.

BACKGROUND

IoT refers to the Internet of Things. IoT devices may be various kinds of information sensors and controllers or various kinds of smart home appliances. The IoT devices access the Internet in a variety of ways to form an immense network, thereby realizing extension of the Internet from people to things.

Among IoT access methods, a Wi-Fi IoT access method has the widest application, the lowest cost, and the best scalability. A Wi-Fi IoT device usually accesses a network directly via a Wi-Fi access point (also referred to as a Wi-Fi hotspot or a wireless router). However, most Wi-Fi IoT devices are relatively monofunctional with a relatively small capacity of data exchange. In many cases, Wi-Fi IoT devices have a relatively large spatial distance therebetween with a relatively low density of device distribution (it is impossible for them to act as relays for each other) when a Wi-Fi IoT is networked; besides, these devices have a relatively low data rate requirement in most occasions. As a consequence, in some application scenarios, it will occur that a physical distance for a traditional Wi-Fi link will reach or even exceed a maximum limit. Or, in the case of relatively complex channel conditions in a coverage space of the Wi-Fi IoT, for a high-rate Wi-Fi signal with a relatively broad frequency band, a relatively long wireless channel multipath time delay or channel time-variation will cause a poor effect for the traditional Wi-Fi link data transmission.

In the prior art, during a Wi-Fi IoT networking process, a considerable number of relay devices need to be additionally configured at appropriate distances or locations for Wi-Fi IoT devices with a scattered distribution or a poor channel condition. However, this scheme will increase implementation complexity of the Wi-Fi IoT, thereby significantly increasing network costs and maintenance difficulty.

The prior art fails to solve the problem of how to expand coverage of a single-protocol IoT; besides, it is complex in implementation with a relatively high cost.

SUMMARY

To address the above drawbacks existing in the prior art, the present disclosure provides a method for heterogeneously networking a Wi-Fi IoT and a heterogeneous Wi-Fi IoT architecture. When it is needed to long-distantly lay out Wi-Fi IoT devices with a low density, a Wi-Fi IoT subnetwork with a reduced data rate is employed to expand an effective signal coverage of the subnetwork and perform data exchange with a standard full-rate Wi-Fi IoT device via a Wi-Fi IoT bridging device.

The present disclosure is implemented through a technical solution below:

A method for heterogeneously networking a Wi-Fi IoT, comprising: arranging at least one Wi-Fi IoT bridging device in the Wi-Fi IoT, wherein the Wi-Fi IoT bridging device is in a time division manner, and the Wi-Fi IoT bridging device communicates with at least one long-distance IoT device in a reduced data rate mode.

The reduced data rate mode is a reduced baseband rate mode; and

The Wi-Fi IoT bridging device is a baseband rate-tunable Wi-Fi IoT bridging device, and the Wi-Fi IoT bridging device communicates with the at least one long-distance IoT device in the reduced baseband rate mode.

The reduced baseband rate refers to reducing a sampling rate to any fraction of a standard full-sampling rate.

The reduced baseband rate refers to reducing the sampling rate to ½ or ¼ of the standard full-sampling rate.

The bridging device performs data transmission with the long-distance IoT device through a reduced baseband rate physical layer demodulation and MAC layer parsing, or MAC layer encapsulation and physical layer modulation.

The reduced data rate mode is a long symbol period 11b mode; and the Wi-Fi IoT bridging device is a Wi-Fi IoT bridging device that supports a long symbol period 11b mode, the bridging device communicating with the at least one long-distance IoT device in the long symbol period 11b mode.

The long symbol period is preferably any integral multiple of a standard 11b symbol period.

The long symbol period is 2 or 4 times the standard 11b symbol period.

The long symbol period 11b mode refers to a lengthened symbol period by lengthening a spreading code length without changing a working clock frequency of a baseband module under an 802.11b working mode.

The bridging device performs data transmission with the long-distance IoT device through a long symbol period 11b mode physical layer demodulation, MAC layer parsing or MAC layer encapsulation, and physical layer modulation.

The Wi-Fi IoT bridging device has a function of a normal Wi-Fi IoT device and accesses the Internet by being normally linked to a Wi-Fi access point.

The bridging device performs data transmission with the full-baseband rate device through a full-baseband rate physical layer demodulation, MAC layer parsing or MAC layer encapsulation, and physical layer modulation.

The bridging device performs the full-baseband rate physical layer demodulation and MAC layer parsing to downlink data from the full-baseband rate device, reperforms the reduced baseband rate MAC layer encapsulation and physical layer modulation, and then forwards the re-encapsulated and modulated data to the long-distance IoT device within different timeslots in a time-division manner.

The bridging device performs data transmission with a normal Wi-Fi device through the full-baseband rate physical layer demodulation and MAC layer parsing, or MAC layer encapsulation and physical layer modulation.

The bridging device performs the physical layer demodulation and MAC layer parsing to the downlink data from the normal Wi-Fi device, reperforms the long symbol period 11b mode MAC layer encapsulation and physical layer modulation, and then forwards the re-encapsulated and modulated data to the long-distance IoT device working at the long symbol period 11b mode within different timeslots in a time-division manner.

A heterogeneous IoT architecture comprises:

a wireless router that is connected with an IoT and supports a standard Wi-Fi link;

a bridging device that is connected with the wireless router via the standard Wi-Fi link; and a reduced data rate mode Wi-Fi device that is connected with the bridging device in a reduced data rate mode.

The reduced data rate mode refers to a reduced baseband rate mode and/or a long symbol period 11b mode; and The reduced data rate mode Wi-Fi device is a reduced baseband rate Wi-Fi device and/or a long symbol period 11b mode Wi-Fi device, the reduced baseband rate Wi-Fi device being connected with the bridging device in the reduced data rate mode, and the long symbol period 11b mode Wi-Fi device being connected with the bridging device in the long symbol period 11b mode.

The bridging device comprises: a clock switching control module, a sampling rate-tunable MAC module, a sampling rate-tunable Wi-Fi digital modulation/demodulation baseband module, a a sampling rate-tunable ADC analog baseband module, and a sampling rate-tunable DAC analog baseband module, wherein the clock switching control module implements a variable baseband rate of the bridging device by controlling the sampling rate-tunable MAC and the working sampling rates of respective baseband modules without changing any physical layer modulation manner or the MAC layer protocol details in circuit implementation.

The bridging device comprises: a mode control module, a mode-tunable MAC module, a mode-tunable Wi-Fi digital modulation/demodulation baseband module, and a mode-tunable ADC analog baseband module, and a mode-tunable DAC analog baseband module, wherein the mode control module adjusts a baseband preamble format by controlling a work mode of the digital baseband module and changing a spreading sequence of baseband modulation/demodulation, thereby improving an AGC (Automatic Gain Control)'s search performance with respect to the new spreading sequence.

Compared with the prior art, the present disclosure may significantly improve the IoT coverage, withstand severe channel conditions, and enhance the stability of signal transmission; meanwhile, the present disclosure is easily implemented without additional devices; and it is also unnecessary to make a significant modification to circuit implementation of existing IoT devices.

DETAILED DESCRIPTION OF EMBODIMENTS

Figure 1:
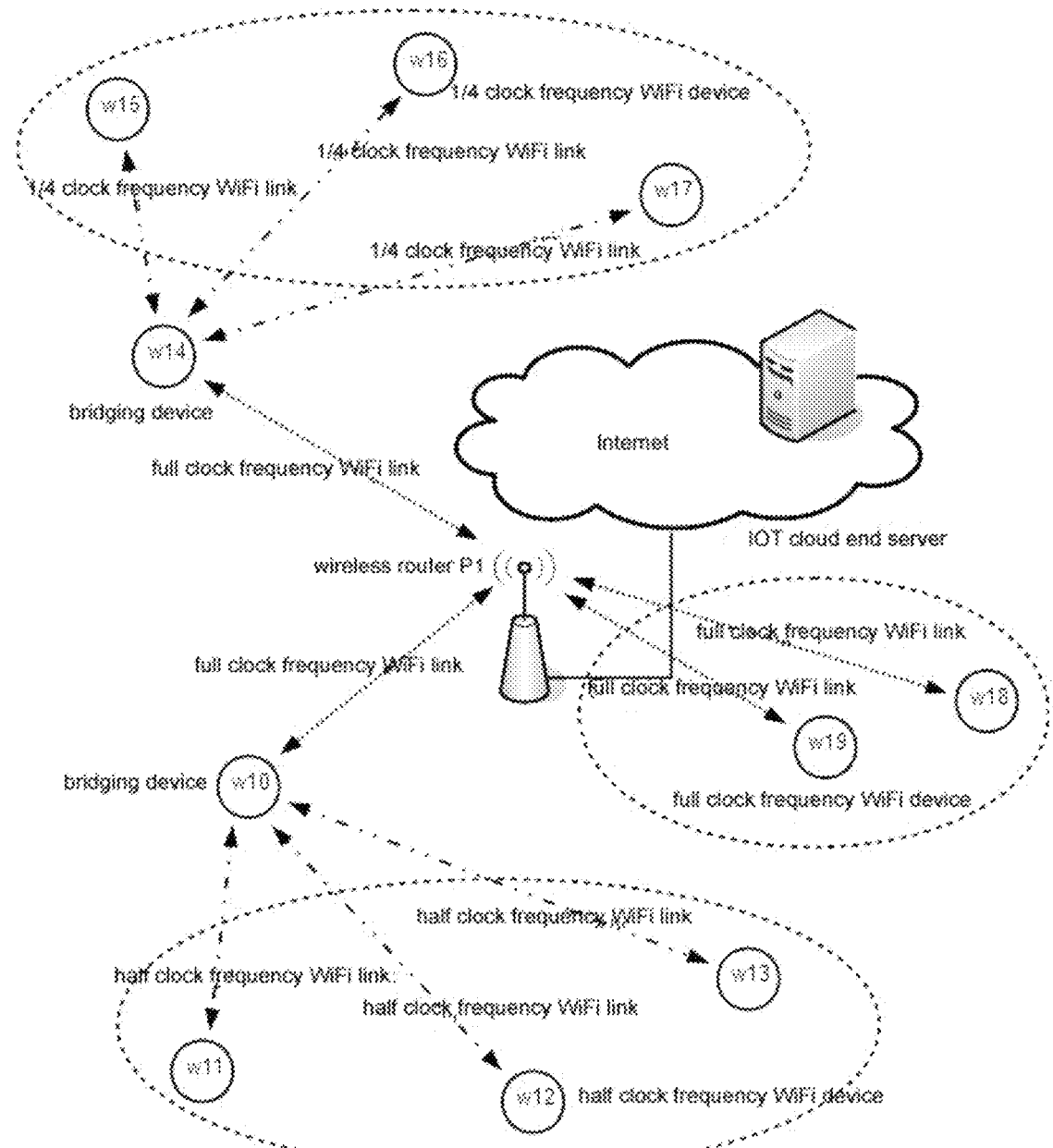
FIG. 1 is a structural schematic diagram of embodiment 1 of a method for heterogeneously networking a Wi-Fi IoT according to the present disclosure.

Hereinafter, the embodiments of the present disclosure will be illustrated in detail. The embodiments are implemented on the premise of the technical solutions of the present disclosure. Although detailed implementation approaches and specific operation procedures are provided, the protection scope of the present disclosure is not limited to the embodiments below.

The present disclosure discloses a method for heterogeneously networking a Wi-Fi IoT, comprising: arranging at least one Wi-Fi IoT bridging device in the Wi-Fi IoT, wherein the Wi-Fi IoT bridging device is in a time division manner, and the Wi-Fi IoT bridging device communicates with at least one long-distance IoT device in a reduced data rate mode. The Wi-Fi IoT bridging device has a function of a normal Wi-Fi IoT device and accesses the Internet by being normally linked to a Wi-Fi access point.

In the present disclosure, the Wi-Fi IoT bridging device communicates with at least one long-distance IoT device in a reduced data rate mode, and when it is needed to long-distantly lay out Wi-Fi IoT devices with a low density, a Wi-Fi IoT subnetwork with a reduced data rate is employed to expand an effective signal coverage of the subnetwork and perform data exchange with a standard full-rate Wi-Fi IoT device via a Wi-Fi IoT bridging device.

The time-division manner in the present disclosure means that: the bridging device shares its MAC module, baseband module and RF module between two different modes of subnetworks, such that it is needed to separately process data transmitted on different modes of links in a time-division manner; a timeslot ratio between the two modes is determined by respective data rate requirements of the long-distance IoT device and the bridging device.

The reduced data rate mode in the present disclosure refers to a reduced baseband rate mode and/or a long symbol period 11b mode.

The Wi-Fi IoT bridging device is a baseband rate-tunable Wi-Fi IoT bridging device, and the Wi-Fi IoT bridging device communicates with the at least one long-distance IoT device in the reduced baseband rate mode. The reduced baseband rate refers to reducing a sampling rate to any fraction of a standard full-sampling rate. In the present disclosure, a fraction of the standard full-sampling rate to which the sampling rate is reduced may be selected based on the distance; preferably the sampling rate is reduced to ½ or ¼ of the standard full-sampling rate.

The bridging device performs data transmission with the long-distance IoT device through reduced baseband rate physical layer demodulation, MAC layer parsing or MAC layer encapsulation, or physical layer modulation; The bridging device performs data transmission with the full-baseband rate device through full-baseband rate physical layer demodulation, MAC layer parsing or MAC layer encapsulation, and physical layer modulation.

The bridging Wi-Fi IoT device of the present disclosure may have a function of a normal Wi-Fi IoT device and accesses the Internet by being normally linked to a Wi-Fi access point. The bridging device performs the reduced baseband rate physical layer demodulation and MAC layer parsing to uplink data from the long-distance IoT device, reperforms the full-baseband rate MAC layer encapsulation and physical layer modulation, and then forwards the re-encapsulated and modulated uplink data to the full-baseband rate device within different timeslots in a time-division manner; and the bridging device performs the full-baseband rate physical layer demodulation and MAC layer parsing to downlink data from the full-baseband rate device, reperforms the reduced-baseband rate MAC layer encapsulation and physical layer modulation, and then forwards the re-encapsulated and modulated data to the long-distance IoT device within different timeslots in a time-division manner.

A normal full-baseband rate Wi-Fi device has a relatively large transmission distance if it works at a relatively low data rate mode with a relatively small modulation order over the wireless channel. Therefore, in order to improve the signal transmission distance, it is most meaningful to employ a reduced baseband rate IoT subnetwork to reduce the baseband rate based on a small data rate. For example, a sampling rate used in an MAC module and a baseband module for a 1 Mbps full-baseband rate mode, the actual baseband rate is correspondingly reduced to ½, and the signal bandwidth is reduced to ½ of the full base-band rate, thereby improving the performance of withstanding wireless channel multi-path fading and enlarging the physical distance of stable data transmission.

The Wi-Fi IoT bridging device is a Wi-Fi IoT bridging device that supports a long symbol period 11b mode, the bridging device communicating with at least one long-distance IoT device in a long symbol period 11b mode. The long symbol period is an integral multiple of the standard 11b symbol period. In the present disclosure, the multiple between the long symbol period and the standard 11b symbol period is selected based on distance; preferably, the long symbol period is 2 or 4 times the standard 11b symbol.

The long symbol period 11b mode refers to a lengthened symbol period by lengthening a spreading code length without changing a working clock frequency of a baseband module under an 802.11b working mode.

The bridging device performs data transmission with the long-distance IoT device through the long symbol period 11b mode physical layer demodulation, MAC layer parsing or MAC layer encapsulation, and physical layer modulation; the bridging device performs data transmission with a normal Wi-Fi device through the physical layer demodulation, MAC layer parsing or MAC layer encapsulation, and physical layer modulation. The Wi-Fi IoT bridging device may have a function of a normal Wi-Fi IoT device and access the Internet by being normally linked to a Wi-Fi access point. The bridging device performs the long symbol period 11b mode physical layer demodulation and MAC layer parsing to uplink data from the long-distance IoT device, reperforms a normal Wi-Fi MAC layer encapsulation and physical layer modulation, and then forwards the re-encapsulated and modulated uplink data to the normal Wi-Fi device within different timeslots in a time-division manner; and the bridging device performs the physical layer demodulation and MAC layer parsing to downlink data from the normal Wi-Fi device, reperforms the long symbol period 11b mode MAC layer encapsulation and physical layer modulation, and then forwards the re-encapsulated and modulated downlink data to the long-distance IoT device working at the long symbol period 11b mode within different timeslots in a time-division manner.

In the present disclosure, because a standard Wi-Fi device has a relatively large transmission distance when it works at a relatively low data rate with a relatively small modulation order on the wireless channel, an IoT subnetwork in the long symbol period 11b mode is employed to improve the signal transmission distance, and it is most meaningful to prolong the symbol period and reduce the baseband rate based on a small data rate. For example, a 1 Mbps standard 11b mode is prolonged to twice the standard symbol period by prolonging the symbol period, the data rate is reduced to ½ (i.e., 0.5 Mbps) of the standard, and the relevant sequence is lengthened, which may withstand a lower signal-to-noise rate and enlarge the physical distance for stable data transmission.

The standard Wi-Fi device according to the present disclosure includes, but not limited to: a Wi-Fi access point, an IoT device that performs a standard distance data transmission, etc. The long distance IoT device includes, but not limited to: environment monitoring IoT devices distributed with a relatively long distance, IoT networked lighting devices, and etc.

Embodiment 1

The heterogeneous Wi-Fi IoT shown in FIG. 1 comprises: two low-baseband rate Wi-Fi IoT subnetworks, wherein w10 and w14 are Wi-Fi IoT bridging devices.

Dependent on different Wi-Fi IoT coverages, a low-baseband rate Wi-Fi IoT subnetwork comprising w11, w12, and w13 adopts a half baseband rate to cover a relatively large scope; a low-baseband rate Wi-Fi IoT subnetwork comprising w15, w16, and w17 adopts a ¼ baseband rate to cover a larger scope.

In the heterogeneous Wi-Fi IoT, the Wi-Fi IoT bridging devices w10 and w14 perform data exchanges in a time division mode between a wireless router P1 (on a full-baseband rate Wi-Fi link) and a reduced-baseband rate Wi-Fi IoT subnetwork device (on a corresponding reduced-rate Wi-Fi link). The Wi-Fi IoT bridging devices w10 and w14 perform demodulation and parsing to the received data from their respective Wi-Fi IoT subnetwork devices, re-encapsulate and modulate the data, and then transmit the re-encapsulated and modulated data to the wireless router P1.

Likewise, the Wi-Fi IoT bridging devices w10 and w14 demodulate and parse a data packet to be transmitted by the wireless router P1 to the devices within their bridged Wi-Fi IoT subnetworks, re-encapsulate and modulate the data packet, and then forward the re-encapsulated and modulated data packet to the corresponding Wi-Fi IoT subnetwork devices at a reduced baseband rate.

The Wi-Fi IoT bridging devices w10 and w14 may simultaneously act as a normal full-baseband rate Wi-Fi IoT devices to perform data exchange with the Wi-Fi access point wireless router P1.

The wireless router P1 is further configured with two normal full-baseband rate Wi-Fi IoT devices w18 and w19.

Embodiment 2

Figure 2:
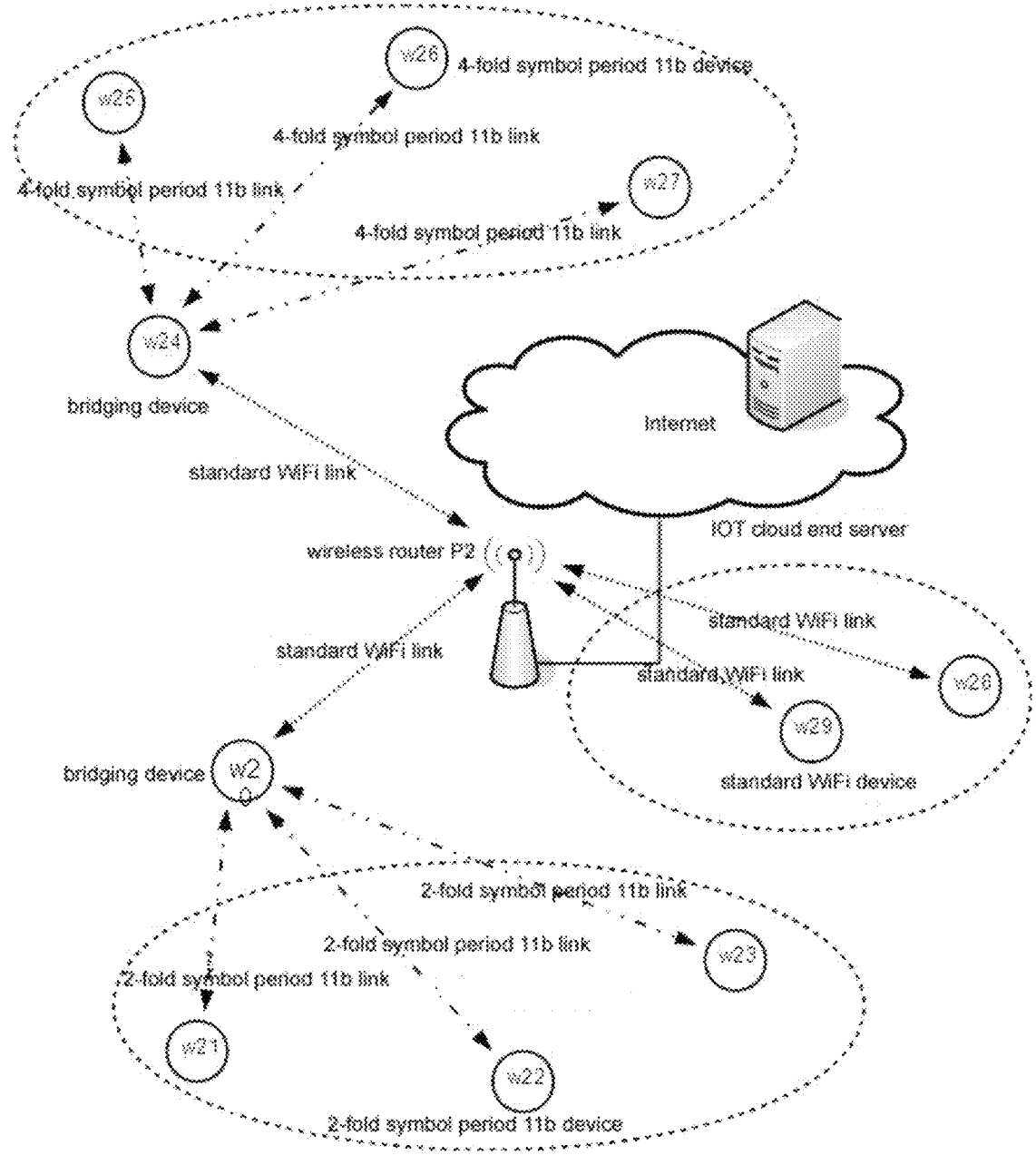
FIG. 2 is a structural schematic diagram of embodiment 2 of the method for heterogeneously networking a Wi-Fi IoT according to the present disclosure.

The heterogeneous IoT shown in FIG. 2 comprises two Wi-Fi IoT subnetworks in a long symbol period 11b mode, wherein w20 and w24 are Wi-Fi IoT bridging devices.

Dependent on different coverages of the Wi-Fi IoT, the long-symbol period 11b mode IoT subnetwork comprising w21, w22, and w23 adopts a 2-fold symbol period, and the spreading sequence is twice the standard 11b, thereby covering a relatively large scope; the long symbol period 11b mode IoT subnetwork comprising w25, w26, w27 adopts a 4-fold symbol period, and the spreading sequence is 4 times the standard 11b, thereby covering a larger scope.

In the heterogeneous Wi-Fi IoT, the Wi-Fi IoT bridging devices w20 and w24 perform, in a time division mode, data exchange between the wireless router P2 (on a standard Wi-Fi link) and the long symbol period 11b IoT subnetwork device (on a corresponding link). The Wi-Fi IoT bridging devices w20 and w24 perform demodulation and parsing to the received data from their respective Wi-Fi IoT subnetwork devices, re-encapsulate and modulate the data, and then transmit the re-encapsulated and modulated data to the wireless router P2 in an appropriate timeslot.

The spreading sequence of the long symbol period 11b mode may be simply generated by the standard 11b spreading sequence, e.g., [+standard 11b sequence−standard 11b sequence]. In this way, mutual interference between the signals sent by the standard 11b device and the subnetwork device may be effectively avoided.

Likewise, the Wi-Fi IoT bridging devices w20 and w24 perform demodulation and parsing to a data packet to be sent by the wireless router P2 to the devices within their bridged Wi-Fi IoT subnetworks, re-encapsulate and modulate the data packet, and then forward the re-encapsulated and modulated data packet to the corresponding Wi-Fi IoT subnetwork devices in the long symbol period 11b.

The Wi-Fi IoT bridging devices w20 and w24 may act as normal standard Wi-Fi IoT devices to exchange data with the Wi-Fi access point P2.

The wireless router P2 is further configured with two standard Wi-Fi IoT devices w28 and w29.

Embodiment 3

Figure 3:
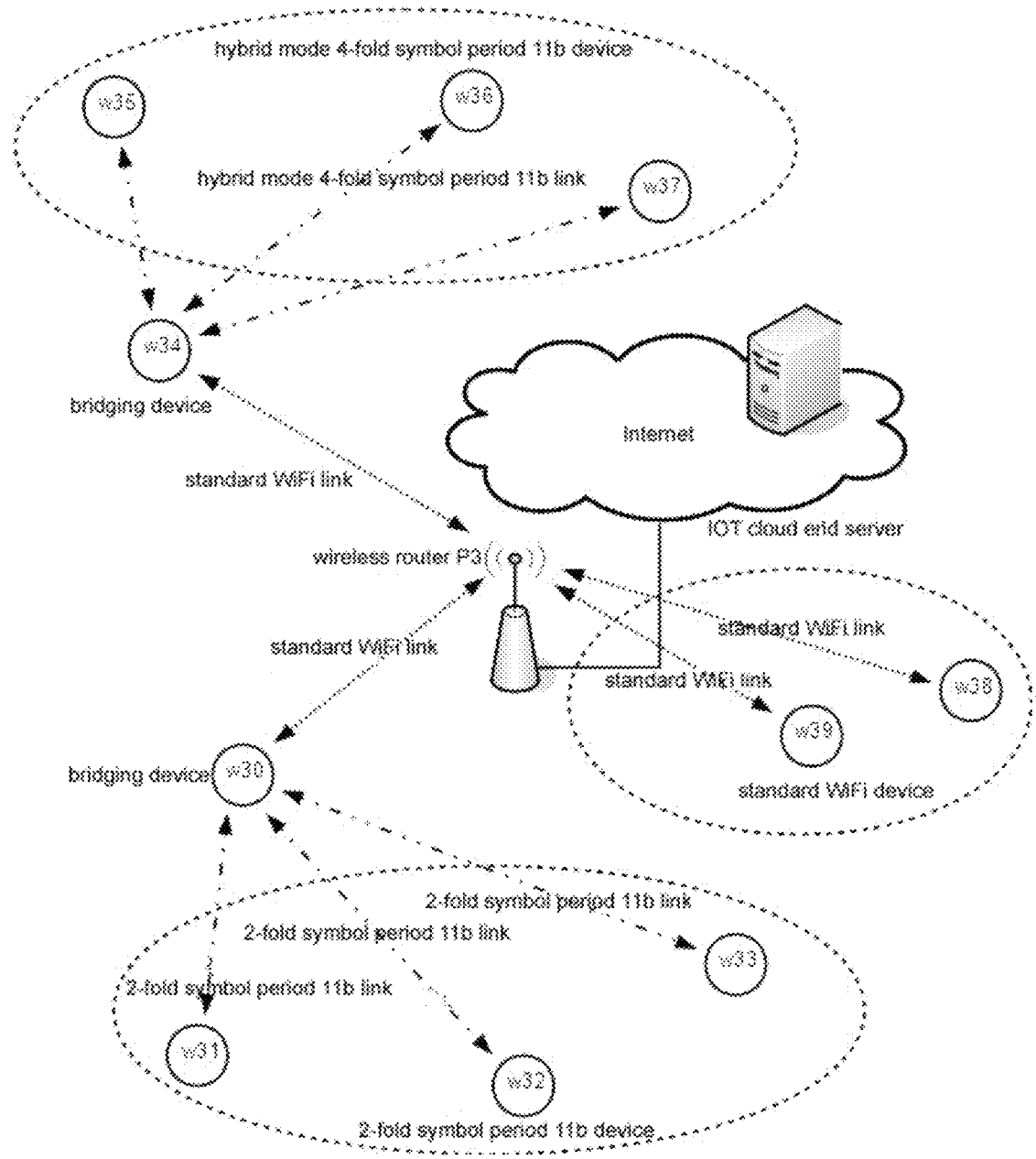
FIG. 3 is a structural schematic diagram of embodiment 3 of the method for heterogeneously networking a Wi-Fi IoT according to the present disclosure.

The heterogeneous Wi-Fi IoT shown in FIG. 3 comprises: two reduced-data rate mode Wi-Fi IoT subnetworks, wherein w30 and w34 are Wi-Fi IoT bridging devices.

Dependent on different Wi-Fi IoT coverages, a long symbol period 11b mode IoT subnetwork comprising w31, w32, and w34 adopts a 2-fold symbol period, and the spreading sequence is twice the standard 11b, thereby covering a relatively large scope; a reduced data rate mode IoT subnetwork comprising w35, w36, and w37 adopts a 4-fold symbol period 11b mode: the spreading sequence is twice the standard 11b, and meanwhile, the baseband clock rate is reduced to ½ of the standard so as to cover a larger scope.

In the heterogeneous Wi-Fi IoT, the Wi-Fi IoT bridging devices w0 and w4 perform, in a time division manner, data exchanging between the wireless router P (on the standard Wi-Fi link) and the long symbol period 11b IoT subnetwork device (on the corresponding link). The Wi-Fi IoT bridging devices w0 and w4 perform demodulation and parsing to the received data from their respective Wi-Fi IoT subnetwork devices, re-encapsulate and modulate the data, and transmit the re-encapsulated and modulated data to the wireless router P3 in an appropriate timeslot.

The spreading sequence of the long symbol period 11b mode may be simply generated by the standard 11b spreading sequence, e.g., [+standard 11b sequence−standard 11b sequence]. In this way, mutual interference between signals transmitted by the standard 11b device and the subnetwork device may be effectively avoided.

Likewise, the Wi-Fi IoT bridging devices w30 and w34 perform demodulation and parsing to a data packet to be transmitted by the wireless router P3 to the devices in their bridged Wi-Fi IoT subnetworks, re-encapsulate and modulate the data packet, and transmit the re-encapsulated and modulated data packet to the corresponding Wi-Fi IoT subnetwork devices in the long symbol period 11b mode.

The Wi-Fi IoT bridging devices w30 and w34 may simultaneously act as normal standard Wi-Fi IoT devices to exchange data with the Wi-Fi access point P3.

The wireless router P3 is further configured with two standard Wi-Fi IoT devices w38 and w39.

Embodiment 4

Figure 4:
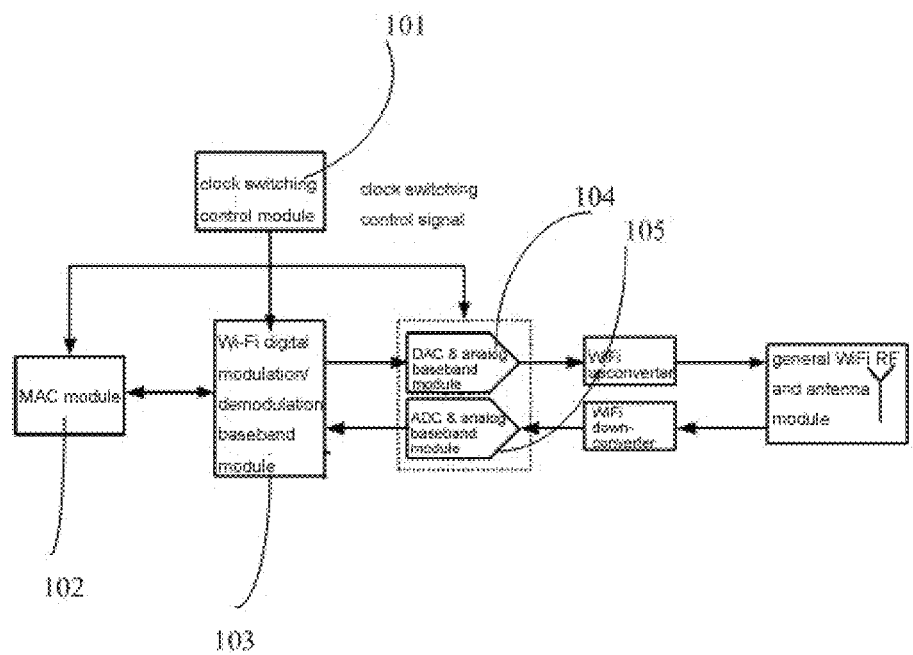
FIG. 4 is a structural diagram of embodiment 1 of a bridging device according to the present disclosure.

A heterogeneous IoT architecture as shown in FIG. 4 comprises:

a wireless router that is connected with the IoT and supports a standard Wi-Fi link;

a bridging device and/or Wi-Fi device that are connected with the wireless router via a standard Wi-Fi link;

a reduced data rate mode Wi-Fi device that is connected with the bridging device via a reduced data rate mode, the reduced data rate mode being a reduced baseband rate mode;

The reduced data rate mode Wi-Fi device is a reduced baseband rate Wi-Fi device, the reduced baseband rate Wi-Fi device and the bridging device being connected via a reduced data rate mode. The bridging device comprises: a clock switching control module 101, a sampling rate-tunable MAC module 102, a Wi-Fi digital modulation/demodulation baseband module 103 an ADC analog baseband module 104, and a DAC analog baseband module 105, wherein the clock switching control module implements a variable baseband rate of the bridging device by controlling the sampling rate-tunable MAC and the working sampling rates of respective baseband modules without changing any physical layer modulation manner or the MAC layer protocol details in circuit implementation.

The Wi-Fi heterogeneous IoT device applied in the present embodiment comprises:

1) a baseband sampling rate-tunable baseband module;

2) supports a relatively narrow bandwidth under a low baseband rate;

3) supports a time-division mode defined for digital exchange with a Wi-Fi IoT bridge.

And the Wi-Fi IoT bridging device in the heterogenous IoT supports data exchange in a time division mode between the full-baseband rate Wi-Fi access point and the low baseband rate Wi-Fi IoT subnetwork device.

Embodiment 5

Figure 5:
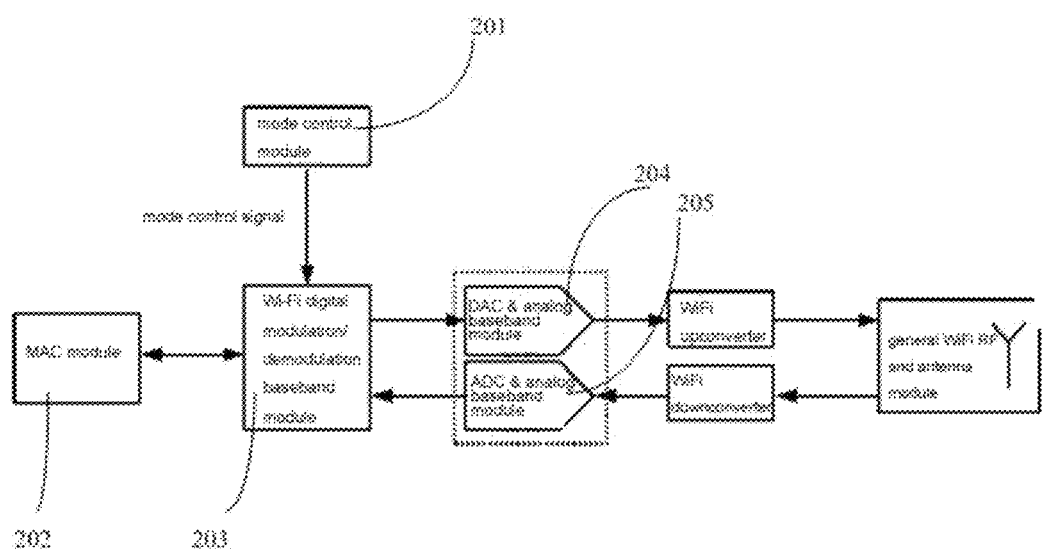
FIG. 5 is a structural diagram of embodiment 2 of the bridging device according to the present disclosure.

As shown in FIG. 5, a heterogeneous IoT architecture comprises:

a wireless router that is connected with an IoT and supports a standard Wi-Fi link;

a bridging device that is connected to the wireless router via a standard Wi-Fi link; and a reduced data rate mode Wi-Fi device that is connected to the bridging device via a reduced data rate mode, the reduced data rate mode being a long symbol period 11b mode; wherein the reduced data rate mode Wi-Fi device is a long symbol period 11b mode Wi-Fi device that is connected to the bridging device via the long symbol period 11b mode. The bridging device comprises: a mode control module 201 and a mode-tunable MAC module 202, a Wi-Fi digital modulation/demodulation baseband module 203, and an ADC analog baseband module 204, and a/DAC analog baseband module 205, wherein the mode control module may also make a simple adjustment to the baseband preamble format by controlling the working mode of the digital baseband module and changing the spreading sequence of the baseband modulation/demodulation, thereby improving the AGC's search performance to the new spreading sequence.

The Wi-Fi heterogeneous IoT device applied to the present disclosure:

1) supports a long symbol period 11b mode baseband module;

2) supports a time division mode defined for performing data exchange with the Wi-Fi IoT bridge.

Moreover, the Wi-Fi IoT bridging device in the heterogenous IoT supports data exchange in a time division mode between the standard Wi-Fi access point and the long symbol period 11b mode Wi-Fi IoT subnetwork device.

What have been described above are only preferred embodiments of the present disclosure, not for limiting the present disclosure. Any modifications, equivalent substitutions, and improvements made within the spirit and principle of the present disclosure should be included within the protection scope of the present disclosure.

We claim:

1. A method for heterogeneously networking a Wi-Fi IoT, comprising: arranging at least one Wi-Fi IoT bridging device in the Wi-Fi IoT, wherein the Wi-Fi IoT bridging device is in a time division manner, and the Wi-Fi IoT bridging device communicates with at least one long-distance IoT device in a reduced data rate mode in association with the time division manner of communicating with the at least one long-distance IoT device, the reduced data rate mode being one of a reduced baseband rate mode and a long symbol period 802.11b mode, wherein, in the reduced baseband rate mode, the Wi-Fi IoT bridging device performs a data exchange in the time division manner between a full-baseband rate Wi-Fi IoT device and a reduced-rate Wi-Fi subnetwork device, and the bridging device performs a data transmission with the long-distance IoT device through a reduced baseband rate physical layer demodulation and MAC layer parsing or through a reduced baseband rate MAC layer encapsulation and physical layer modulation, and wherein, in the long symbol period 802.11b mode, the Wi-Fi IoT bridging device performs the data exchange in the time division manner between a standard Wi-Fi IoT device in an 802.11b working mode and a Wi-Fi IoT subnet device in the long symbol period 802.11b mode, the long symbol period 802.11b mode being a lengthened symbol period by lengthening a spreading code length without changing a working clock frequency of a baseband module under the 802.11b working mode.

2. The method for heterogeneously networking a Wi-Fi IoT according to claim 1, wherein when the reduced data rate mode is a reduced baseband rate mode, the Wi-Fi IoT bridging device is a baseband rate-tunable Wi-Fi IoT bridging device, and the Wi-Fi IoT bridging device communicates with the at least one long-distance IoT device in the reduced baseband rate mode.

3. The method for heterogeneously networking a Wi-Fi IoT according to claim 2, wherein the reduced baseband rate refers to reducing a sampling rate to any fraction of a standard full-sampling rate.

4. The method for heterogeneously networking a Wi-Fi IoT according to claim 3, wherein the reduced baseband rate refers to reducing the sampling rate to ½ or ¼ of the standard full-sampling rate.

5. The method for heterogeneously networking a Wi-Fi IoT according to claim 1, wherein when the reduced data rate mode is a long symbol period 802.11b mode, the Wi-Fi IoT bridging device is a Wi-Fi IoT bridging device that supports a long symbol period 802.11b mode, the bridging device communicating with the at least one long-distance IoT device in the long symbol period 802.11b mode.

6. The method for heterogeneously networking a Wi-Fi IoT according to claim 5, wherein a long symbol period is preferably any integral multiple of a standard 802.11b symbol period.

7. The method for heterogeneously networking a Wi-Fi IoT according to claim 6, wherein the long symbol period is 2 or 4 times the standard 802.11b symbol period.

8. The method for heterogeneously networking a Wi-Fi IoT according to claim 6, wherein the bridging device performs data transmission with the long-distance IoT device through a long symbol period 802.11b mode physical layer demodulation, MAC layer parsing or MAC layer encapsulation, and physical layer modulation.

9. The method for heterogeneously networking a Wi-Fi IoT according to claim 1, wherein the Wi-Fi IoT bridging device has a function of a normal Wi-Fi IoT device and accesses the Internet by being normally linked to a Wi-Fi access point.

10. The method for heterogeneously networking a Wi-Fi IoT according to claim 9, wherein the bridging device performs data transmission with a full-baseband rate device through a full-baseband rate physical layer demodulation, MAC layer parsing or MAC layer encapsulation, and physical layer modulation.

11. The method for heterogeneously networking a Wi-Fi IoT according to claim 10, wherein the bridging device performs the full-baseband rate physical layer demodulation and MAC layer parsing to downlink data from the full-baseband rate device, reperforms the reduced baseband rate MAC layer encapsulation and physical layer modulation, and then forwards the re-encapsulated and modulated data to the long-distance IoT device within different timeslots in a time-division manner.

12. The method for heterogeneously networking a Wi-Fi IoT according to claim 11, wherein the bridging device performs data transmission with a normal Wi-Fi device through the full-baseband rate mode physical layer demodulation and MAC layer parsing, or MAC layer encapsulation and physical layer modulation.

13. The method for heterogeneously networking a Wi-Fi IoT according to claim 12, wherein the bridging device performs the physical layer demodulation and MAC layer parsing to downlink data from the normal Wi-Fi device, reperforms a long symbol period 802.11b mode MAC layer encapsulation and physical layer modulation, and then forwards the re-encapsulated and modulated data to the long-distance IoT device working at the long symbol period 802.11b mode within different timeslots in a time-division manner.

14. A heterogeneous IoT architecture, comprising:
a wireless router that is connected with an IoT and supports a standard Wi-Fi link;
a bridging device that is connected with the wireless router via the standard Wi-Fi link; and
a reduced data rate mode Wi-Fi device that is connected with the bridging device in a reduced data rate mode in association with a time division manner of communicating with the bridging device, the reduced data rate mode being one of a reduced baseband rate mode and a long symbol period 802.11b mode,
wherein, in the reduced baseband rate mode, the bridging device performs a data exchange in the time division manner between a full-baseband rate Wi-Fi IoT device and a reduced-rate Wi-Fi subnetwork device, and the bridging device performs a data transmission with the reduced data rate mode Wi-Fi device through a reduced baseband rate physical layer demodulation and MAC layer parsing or through a reduced baseband rate MAC layer encapsulation and physical layer modulation, and
wherein, in the long symbol period 802.11b mode, the bridging device performs the data exchange in the time division manner between a standard Wi-Fi IoT device in an 802.11b working mode and a Wi-Fi IoT subnet device in the long symbol period 802.11b mode, the long symbol period 802.11b mode being a lengthened symbol period by lengthening a spreading code length without changing a working clock frequency of a baseband module under the 802.11b working mode.

15. The heterogeneous IoT architecture according to claim 14, wherein
the reduced data rate mode Wi-Fi device is a reduced baseband rate Wi-Fi device and/or a long symbol period 802.11b mode Wi-Fi device, the reduced baseband rate Wi-Fi device being connected with the bridging device in the reduced data rate mode, and the long symbol period 802.11b mode Wi-Fi device being connected with the bridging device in the long symbol period 802.11b mode.

16. The heterogeneous IoT architecture according to claim 15, wherein the bridging device comprises: a clock switching control module, a sampling rate-tunable MAC module, a sampling rate-tunable Wi-Fi digital modulation/demodulation baseband module, a sampling rate-tunable ADC analog baseband module, and a sampling rate-tunable DAC analog baseband module, wherein the clock switching control module implements a variable baseband rate of the bridging device by controlling the sampling rate-tunable MAC and the working sampling rates of respective baseband modules without changing any physical layer modulation manner or the MAC layer protocol details in circuit implementation.

17. The heterogeneous IoT architecture according to claim 15, wherein the bridging device comprises: a mode control module, a mode-tunable MAC module, a mode-tunable Wi-Fi digital modulation/demodulation baseband module, and a mode-tunable ADC analog baseband module, and a mode-tunable DAC analog baseband module, wherein the mode control module adjusts a baseband preamble format by controlling a work mode of the digital baseband module and changing a spreading sequence of baseband modulation/demodulation, thereby improving an Automatic Gain Control's search performance with respect to a new spreading sequence.

* * * * *